United States Patent [19]
Veeser et al.

[11] Patent Number: 5,602,946
[45] Date of Patent: Feb. 11, 1997

[54] FIBER OPTIC SENSOR SYSTEM FOR DETECTING MOVEMENT OR POSITION OF A ROTATING WHEEL BEARING

[75] Inventors: Lynn R. Veeser, Los Alamos; Patrick J. Rodriguez, Santa Fe; Peter R. Forman, Los Alamos, all of N.M.; Russell E. Monahan, Ann Arbor; Jonathan M. Adler, Ypsilanti, both of Mich.

[73] Assignee: NTN Technical Center (USA), Ann Arbor, Mich.

[21] Appl. No.: 577,739

[22] Filed: Dec. 22, 1995

[51] Int. Cl.$^6$ .................... G02B 6/00; G01P 3/36
[52] U.S. Cl. .............. 385/12; 385/6; 250/227.21; 324/207.25; 324/244.1; 324/175; 324/96
[58] Field of Search ............... 385/12, 13, 18, 385/19, 25, 26, 6; 359/280, 281; 324/207.23, 207.25, 207.22, 244, 244.1, 96, 173–175; 250/227.11, 227.12, 227.13, 227.21, 227.23

[56] References Cited

U.S. PATENT DOCUMENTS

| | | | |
|---|---|---|---|
| 3,683,219 | 8/1972 | Kruse | 310/168 |
| 4,171,495 | 10/1979 | McNinch, Jr. | 310/155 |
| 4,259,637 | 3/1981 | Bloomfield et al. | 324/166 |
| 4,288,746 | 9/1981 | Singbartl | 324/174 |
| 4,319,188 | 3/1982 | Ito et al. | 324/173 |
| 4,529,875 | 7/1985 | Brogardh et al. | 250/227.23 |
| 4,843,232 | 6/1989 | Emo et al. | 385/6 X |
| 4,922,200 | 5/1990 | Jackson et al. | 324/223 |
| 4,947,035 | 8/1990 | Zook et al. | 250/227.21 X |
| 5,130,650 | 7/1992 | Lemarquand | 324/207.25 X |
| 5,149,962 | 9/1992 | Maurice | 250/227.17 |
| 5,192,862 | 3/1993 | Rudd, III | 250/227.21 |
| 5,200,697 | 4/1993 | Adler et al. | 324/174 |
| 5,399,853 | 3/1995 | Maurice | 250/227.17 |

Primary Examiner—Rodney B. Bovernick
Assistant Examiner—Hemang Sanghavi
Attorney, Agent, or Firm—Harness, Dickey & Pierce, PLC

[57] ABSTRACT

An improved fiber optic sensor system and integrated sensor bearing assembly for detecting movement or position of a rotating wheel bearing having a multi-pole tone ring which produces an alternating magnetic field indicative of movement and position of the rotating member. A magneto-optical material, such as a bismuth garnet iron (B.I.G.) crystal, having discrete magnetic domains is positioned in the vicinity of the tone ring so that the domains align themselves to the magnetic field generated by the tone ring. A single fiber optic cable, preferably single mode fiber, carries light generated by a source of light to the B.I.G. crystal. The light passes through the B.I.G. crystal and is refracted at domain boundaries in the crystal. The intensity of the refracted light is indicative of the amount of alignment of the domains and therefore the strength of the magnetic field. The refracted light is carried by the fiber optic cable to an optic receiver where the intensity is measured and an electrical signal is generated and sent to a controller indicating the frequency of the changes in light intensity and therefore the rotational speed of the rotating wheel bearing.

21 Claims, 7 Drawing Sheets

SATURATING MAGNETIC FIELD
LIGHT RETURNS TO CORE

Fig. 6a — SIGNAL WITH UNBIASED MAGNET

Fig. 6b — SIGNAL WITH UNBALANCED FIELD

Fig. 6c — SIGNAL WITH VARIABLE FIELD BALANCE

Fig. 6d — SIGNAL WITH STRONG FIELD IMBALANCE

Fig. 7

FIBER OPTIC SENSOR SYSTEM FOR DETECTING MOVEMENT OR POSITION OF A ROTATING WHEEL BEARING

FIELD OF THE INVENTION

The present invention relates to a rotational encoder for incorporating into a rotational bearing. More particularly, the present invention relates to a single fiberoptic cable sensor with a magneto-optic crystal and a tone ring for detecting movement or position of a rotating wheel bearing in a bearing assembly.

BACKGROUND OF THE INVENTION

Anti-lock braking systems (ABS) are increasingly popular on present day motor vehicles. Such systems automatically prevent wheel lock-up during hard braking maneuvers by modulating braking pressure in such conditions so that vehicle stability and directional control can be maintained. A critical feature of an ABS is a wheel speed sensor which provides a signal to the ABS controller related to wheel rotation. Passenger cars equipped with ABS typically have such a sensor for each of their four wheels. By monitoring the sensor signals, the braking system controller can determine if a wheel lock-up condition is being approached and thus control the braking system. Wheel system sensors are also used to provide signals for traction control systems which reduce slippage during acceleration. Traction control systems enhance traction by selectively applying braking torque to a spinning wheel causing torque transfer to a non-spinning traction wheel.

Numerous designs of ABS wheel speed sensors are presently known. Such sensors generally consist of a rotating part in close proximity to a stationary part. The rotating part, or "tone ring" has features which can be sensed as they pass the stationary part. Such features are typically ferromagnetic teeth, as on a gear, or magnetic poles which have been applied to the rotating part. The stationary part includes a transducer which can detect the passing of the features as the tone ring rotates. The detection is indicated by an electrical signal which is emitted by the transducer. The transducer may be a variable reluctance device, Hall effect device, magneto-resistive device, or of some other construction. However, some of these systems have problems sensing low/zero speed conditions. Light systems using rotating shutters are also known but do not work reliably in hostile automotive environments.

The use of optical sensors for determining the speed and/or torque of a rotating member has also been contemplated. Automobile manufacturers will eventually switch to optical fiber data communication systems to increase data capacity while reducing weight and cost. Optical sensors typically rely on modulating or changing a characteristic of electromagnetic energy and use a photoelectric device to convert that modulated characteristic into an electrical signal that can be further processed with conventional electronics. For example, optical speed sensors are known that utilize the Faraday rotation effect to detect the rotational speed of an object. Such an apparatus is shown in U.S. Pat. No. 4,947,035 issued to Zook et al. The "Domain diffraction" effect has also been used to detect the rotational speed of an object as disclosed in U.S. Pat. No. 5,192,862 issued to Rudd, Ill.

One disadvantage of the Faraday effect system is that it requires a polarization filter, which adds to the cost of the system. Another disadvantage is that the Faraday effect system requires a multi-mode fiber.

A potential feature of "Domain diffraction" effect systems when used with a multipole magnet frequency doubling. Frequency doubling occurs because the sensor is sensing magnetic strength, and not magnetic direction. Thus, the optical signal reaches a low point when the magnetic signal crosses zero, and the optical signal reaches a high point when the magnetic signal is at a positive or negative peak. If the magnetic fields have some bias ("imbalance" or "offset", where positive fields are not the same strength as negative fields), then the output cycles corresponding to the weaker pole direction will be smaller than those corresponding to the stronger poles. If the bias is very strong, there may be no flux reversal at all. In this case, the output frequency of the sensor would be the same as the frequency of the magnetic excitation (frequency doubling is completely lost).

Thus there is a need for an improved fiber optic sensor system for detecting movement or position of a rotating wheel bearing for use in anti-lock braking systems and traction control systems. There is also a need for reducing the cost needed to implement fiber optic sensor systems in anti-lock braking systems and traction control systems. There is yet a further need for an improved fiber Optic sensor system which is in a completely encased and sealed environment for packaging within a bearing assembly.

SUMMARY OF THE INVENTION

The present invention provides an improved fiber optic sensor system for detecting movement or position of a rotating member. The system is configured to be less expensive and more reliable than existing sensor systems and can be completely encased and sealed for packaging within a wheel bearing assembly.

One object of the present invention is to provide an improved fiber optic sensor system for detecting movement or position of a rotating wheel bearing for use in anti-lock braking systems and traction control systems.

Another object of the present invention is to provide an improved fiber optic sensor system which reduces the cost needed to implement fiber optic sensor systems in anti-lock braking systems and traction control systems.

A further object of the present invention is to provide an improved fiber optic sensor system which is in a completely encased and sealed environment for packaging within a bearing assembly.

In order to achieve the foregoing objects, the present invention provides an improved fiber optic sensor system comprising a light emitting diode (LED), or other source of light which produces light which is carried by a fiber optic cable to a magneto-optical material which is located in close proximity to a multi-pole magnetic tone ring. The magneto-optical material contains discrete domains each of which has an anisotropic index of refraction which rotates with its magnetic direction. The magnetic tone ring is configured to create an varying magnetic field indicative of the speed and position of the rotating member. The tone ring is zero balanced so that the positive and negative peaks of the magnetic signal are of equal strength. Alternatively, the tone ring is configured to have a varying magnetic field having strong and weak signals in a single direction with no flux reversal.

The magnetic field created by the tone ring causes the domains to align themselves in the direction of the magnetic field thus causing the indices of refraction of the domains to become continuous when viewed from a single direction. The strength of the magnetic field dictates the amount the domains align themselves. When the magnetic field is strong the amount of alignment is high and therefore there is little diffraction as the light travels through the magneto-optical material. When the magnetic field is weak the amount of alignment is low and the light is diffracted as it travels through the magneto-optical material. Thus, the amount of light which passes through the material is modulated as a function of the magnetic field strength to produce an optical signal.

A reflective surface can be included for reflecting the optical signal back into the fiber optic cable which carries the reflected light back to a detector. However, a second fiber optic cable could be used in place of the reflective surface to carry the optical signal back to the detector. The detector detects the intensity of the returning light and converts the detected intensity into an electrical signal indicative of the movement and position of the rotating member. This electrical signal can be forwarded to an anti-lock brake controller or traction control controller which can be used for determining when a wheel lock-up or wheel spin condition is occurring and for correcting the condition.

In another alternative embodiment, a back-biasing magnet can be added which forces the magnetic excitation created by the magnetic ring away from zero-crossing eliminating any flux reversal.

Further objects, features and advantages of the invention will become apparent from a consideration of the following description and the appended claims when taken in connection with the accompanying drawings.

BRIEF DESCRIPTION OF THE DRAWINGS

FIB. 4b is an exploded view of light being returned into the core of a fiber optic cable in the optical system of FIG. 1.

DETAILED DESCRIPTION OF THE PREFERRED EMBODIMENT

Preferred embodiments of the improved fiber optic sensor system of the present invention are described herebelow with reference to the drawings.

Referring to FIGS. 1, 2a, 2b and 2c, the fiber optic sensor system, referred to generally at 10, includes a laser diode power supply 12 and laser diode 14 for supplying a laser light which is carried by fiber optic cable 16. An L.E.D. could also be used in place of the laser diode 14 for supplying light to the fiber optic cable 16. Cable 16 carries the light to optic coupler 18 and is forwarded to a bismuth iron garnet (B.I.G.) crystal 20 by fiber optic cable 22. A multi-poled magnetic tone ring 24, of the type disclosed and claimed in U.S. Pat. No. 5,200,697, issued Apr. 6, 1993 to Adler et al. which is incorporated herein by reference, can be used to generate a magnetic field 26 in the vicinity of the B.I.G. crystal 20 which is indicative of movement and position of a rotating member such as a wheel bearing (not shown).

Figures 2A, 2B, 2C:
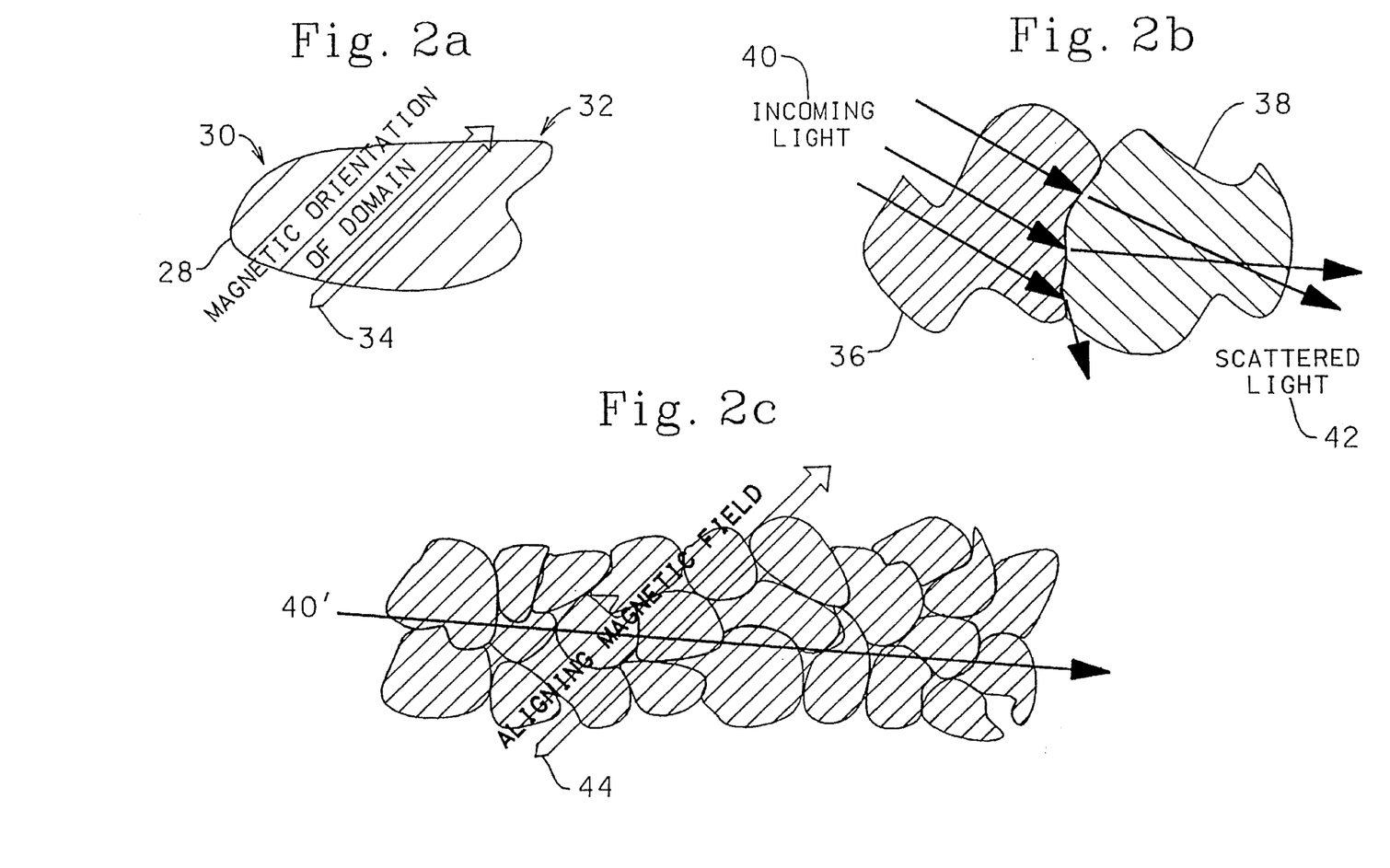
FIG. 2a is a schematic view illustrating optical anisotropy of a domain of a magneto-optic material, such as bismuth iron garnet (B.I.G.), as used in the present invention.
FIG. 2b is a schematic view illustrating light scattering in two randomly oriented domains.
FIG. 2c is a schematic view illustrating light passing through domains aligned using a magnetic field.
Figure 3A:
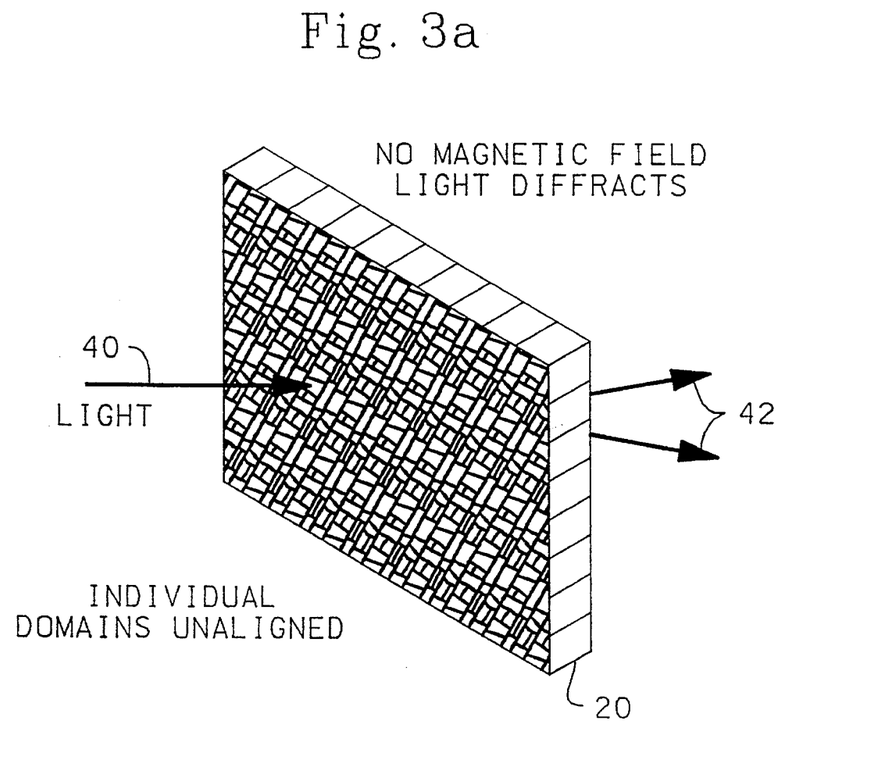
FIG. 3a is a schematic view of light being diffracted by a B.I.G. crystal having unaligned domains.
Figure 3B:
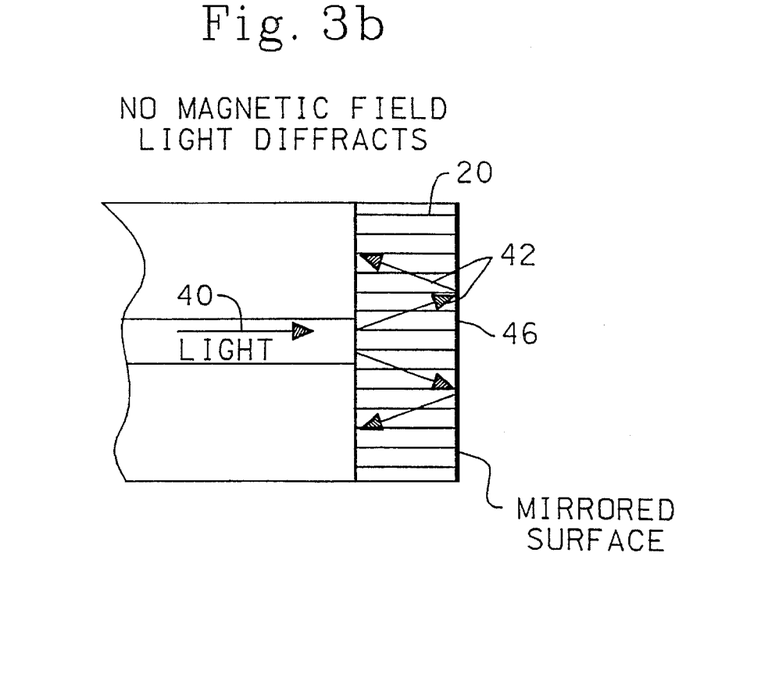
FIG. 3b is an exploded view of light being diffracted in the optical system of FIG. 1.

The B.I.G. crystal 20 is configured with a plurality of domains, each domain having an index of refraction which is anisotropic. As illustrated in FIG. 2a, light that approaches an anisotropic domain 28 from one direction 30 has a different index of refraction than light that approaches the domain 28 from a different direction 32. Each domain has a magnetic orientation 34 which can be affected by placing the domain 28 in a magnetic field. If the domains 36, 38 in the BIG crystal 20 are randomly oriented, as illustrated in FIGS. 2b, 3a, and 3b, then light 40 passing through the crystal 20 will encounter regions with differing indices of refraction. As the light 40 leaves one domain 36 and enters the next domain 38, the change in the index of refraction between the domains 36, 38 will cause the light 40 to refract. Because the domains 36, 38 are randomly oriented, the diffraction will occur randomly and cause some scattering 42 of the light 40.

Figure 4A:
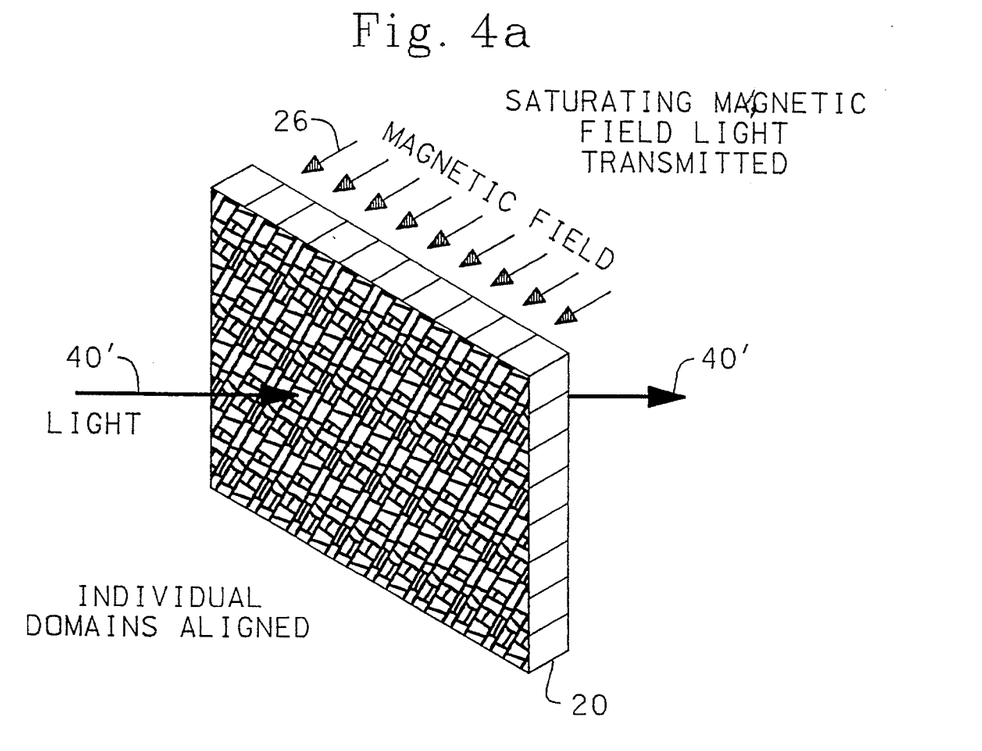
FIG. 4a is a schematic view of light being transmitted through a B.I.G. crystal having aligned domains due to a saturating magnetic field.
Figure 4B:
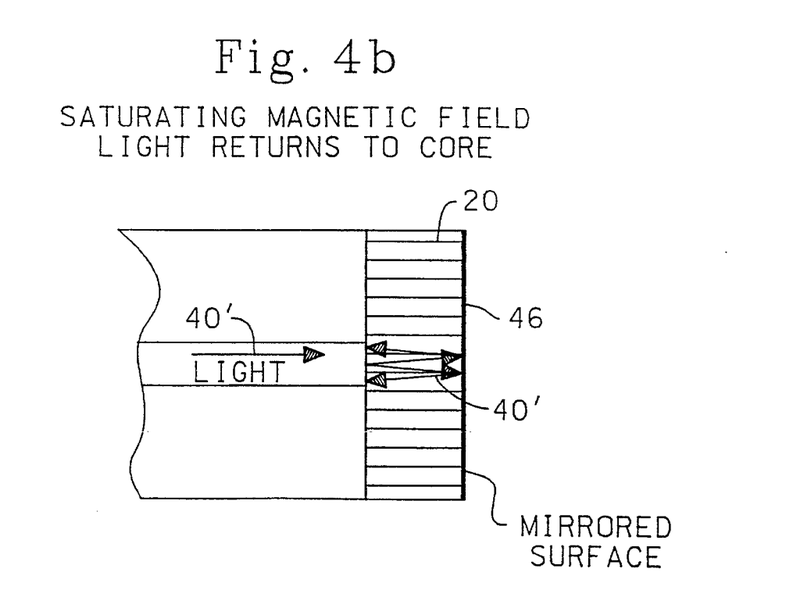

However, as shown in FIGS. 2c, 4a and 4b, an applied magnetic field 44 will cause the domains to change orientation, thus aligning themselves to the magnetic field 44. When the domains are aligned by a strong (saturating magnetic field) then the indices of refraction of the domains become continuous when viewed from a single direction. Since it was the discontinuity of refractive index which causes the scattering, light 40' which passes through the aligned domains is not scattered at the domain boundaries. By harnessing this effect, the B.I.G. crystal 20 and a reflective surface 46 can be used to return a weak optical signal when the crystal 20 is subjected to a weak magnetic field and a strong optical signal when there is a strong field present. Two dimensional domains can cause diffraction which operates in a manner similar to the one discussed above.

Figure 1:
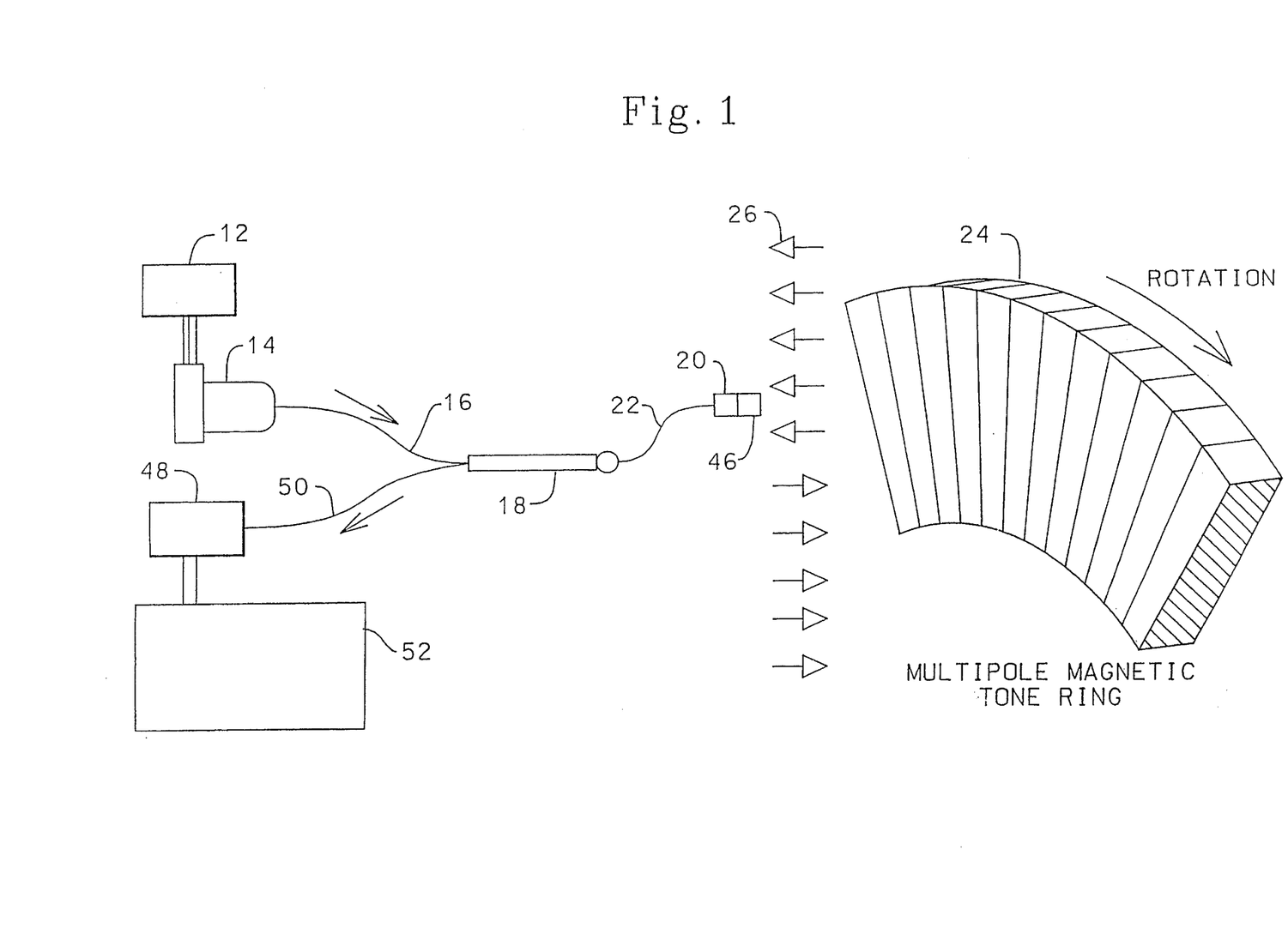
FIG. 1 is a schematic view of a magneto-optical sensor setup according to the present invention.

Light passed through the B.I.G. crystal 20 and reflected back by the reflective surface 46 is carried by cable 22 back to the coupler 18. The coupler 18 forwards the reflected light to an optic receiver 48, through fiber optic cable 50, where the intensity of the reflected light is measured and an electrical signal indicative of the intensity of the reflected light is generated and passed on to an anti-lock brake or traction controller 52 which is configured to detect and correct wheel lock-up or skidding conditions. A second cable could be provided for carrying the light passed through the B.I.G. crystal 20 back to the optical receiver 48.

Figure 5A:
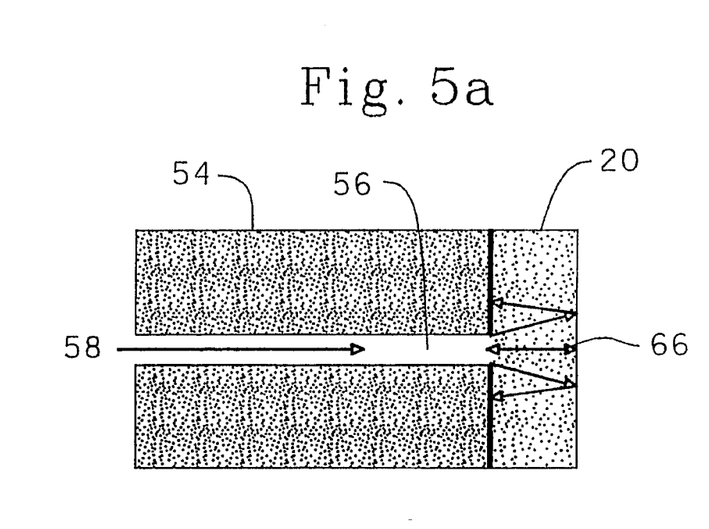
FIG. 5a is an exploded sectional view of a single mode fiber optic cable and B.I.G. crystal.
Figure 5B:
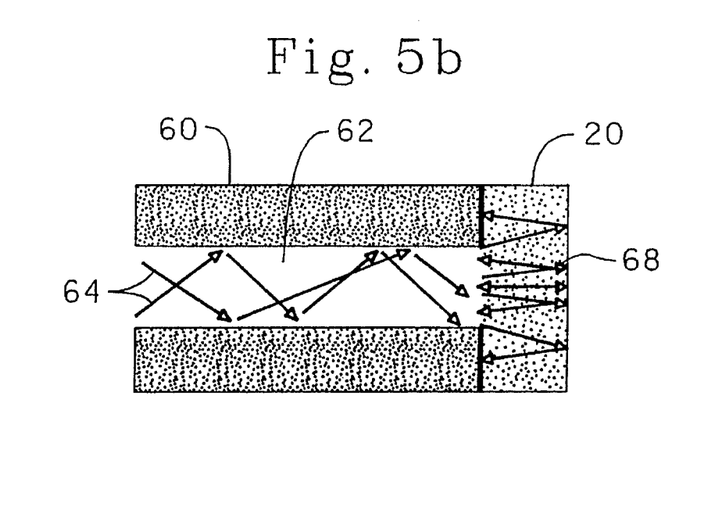
FIG. 5b is an exploded sectional view of a multi-mode fiber optic cable and B.I.G. crystal.

The system 10 works best when a single mode fiber optic cable is used as cable 22. Single mode fiber 54 has a thin core 56, typically 9 μm, and carries only one light wave mode 58 of a given wavelength. Multi-mode fiber 60 has a thick core 62, typically 62 μm, and carries many light wave modes 64 of a given wavelength. Because single mode fiber 54 has a thin core 56, light must be aimed directly into the fiber core and have a direction within a few degrees of parallel 66 to the core in order to re-enter the fiber 54 and be propagated. Therefore, a single mode fiber 54 rejects almost all of the light which has been scattered by the B.I.G. crystal 20. Multi-mode fiber 60 can accept some light which has been scattered 68, because it has a larger numerical aperture than the single mode fiber 54. Therefore, in a multi-mode fiber 60, even if there is wide dispersion, most of the light is returned to the fiber core 62. Therefore, single mode fiber can help provide more accurate readings than multi-mode fiber.

When exposed to balanced, alternating magnetic fields (less than saturation field), the sensor transmits light as a function of the square of the field. When there is no field, much of the light is scattered away, so the returning signal is low. At the saturation field, a minimum of light is scattered, so the returning signal is high. At fields stronger than saturation, no additional light is returned.

Figure 6A:
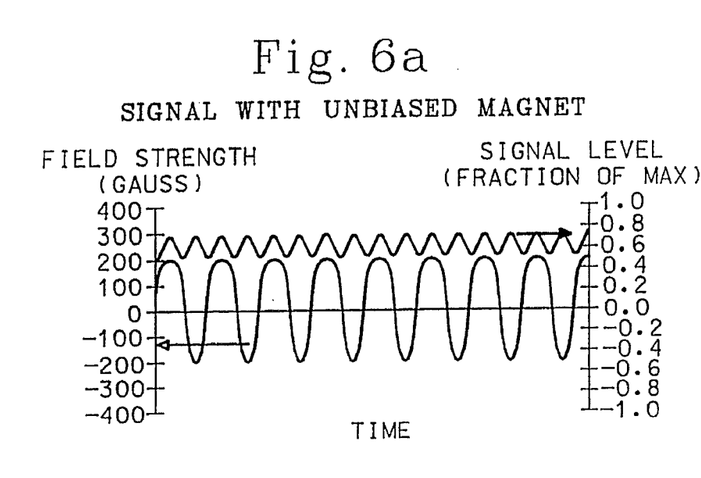
FIG. 6a is an output diagram of the improved fiber optic sensor with a zero-balanced, unbiased magnet.

In the preferred embodiment, there are 36 to 55 magnetic pole pairs on the tone ring 24. However, the sinusoidal output of the sensor can repeat 72 to 110 times per revolution due to "frequency doubling". "Frequency doubling" occurs because the sensor 10 is sensing magnetic strength and not magnetic direction. Thus, the optical signal 70 reaches a low point when the magnetic signal 72 crosses zero, and the optical signal 70 reaches a high point when the magnetic signal 72 is at a positive or negative peak, as shown in FIG. 6a (i.e. domains align in both flux directions to produce the same optical behavior). Because the tone ring 24 is zero-balanced, the positive and negative peaks of the magnetic signal 72 occur at equal strength. Therefore, the sensor optical signal 70 will also have positive and negative peaks of equal strength.

Figure 6B:
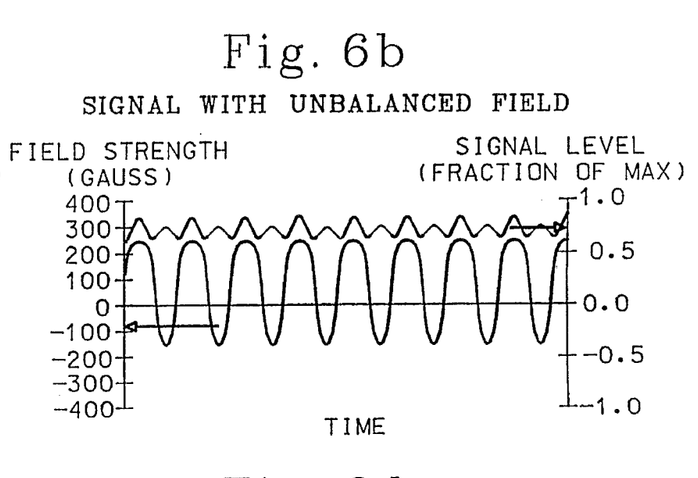
FIG. 6b is an output diagram of a fiber optic sensor with a non-zero field balance.
Figure 6C:
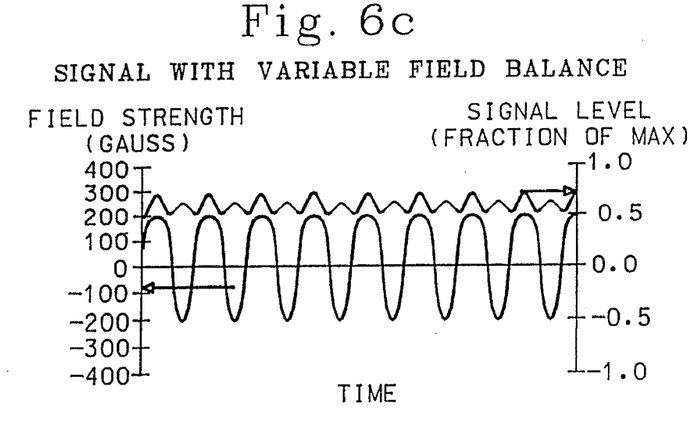
FIG. 6c is an output diagram of a fiber optic sensor with a variable field balance.

Non-ideal signal behavior can occur when the magnetic fields acquire some bias ("imbalance" or "offset", where positive fields are not the same strength as negative fields), as illustrated in FIGS. 6b and 6c. During unbalance or variable balance conditions, the sensor output cycles 70" corresponding to the weaker pole direction will be smaller than those corresponding to the stronger poles. If the bias is very strong, there may be no flux reversal at all (shown in FIG. 6d ). In this case, the output frequency of the sensor output 70' would be the same as the frequency of the magnetic excitation 72" ("frequency doubling" is completely lost). This inconsistency in output behavior can cause unpredictable behavior in anti-lock braking systems or traction control systems relying upon the sensor output.

Figure 6D:
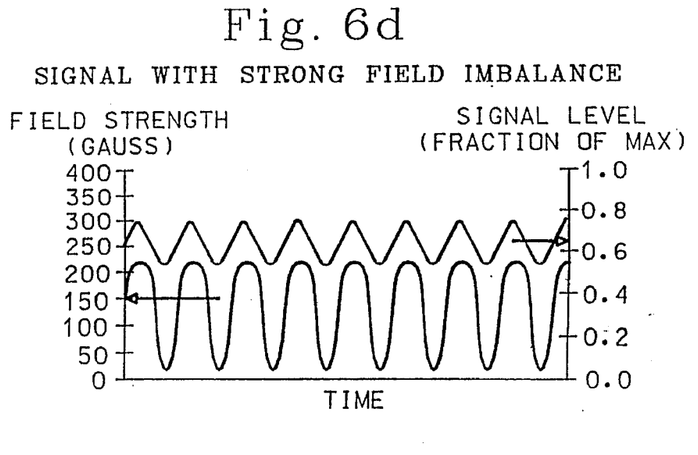
FIG. 6d is an output diagram of the improved fiber optic sensor with a strong field imbalance created by a back-biasing magnet.

In order to avoid the above-mentioned inconsistencies in behavior, the magnetic tone ring 24 can have a zero magnetic bias. In an alternative embodiment, a back-biasing magnetic can included the sensor element 20 or tone ring 24. The back-biasing magnet is configured to force the magnetic excitation away from the zero crossing by adding a strong field imbalance (as shown in FIG. 6d ). The use of a back-biasing magnet will eliminate "frequency doubling". Thus, the sensor system 10 can be configured and calibrated to expect an optical signal output having the same frequency as the magnetic signal. In the alternative, the tone ring can be configured with a varying magnetic field having strong and weak signals in a single direction with no flux reversal and therefore no "frequency doubling".

Figure 7:
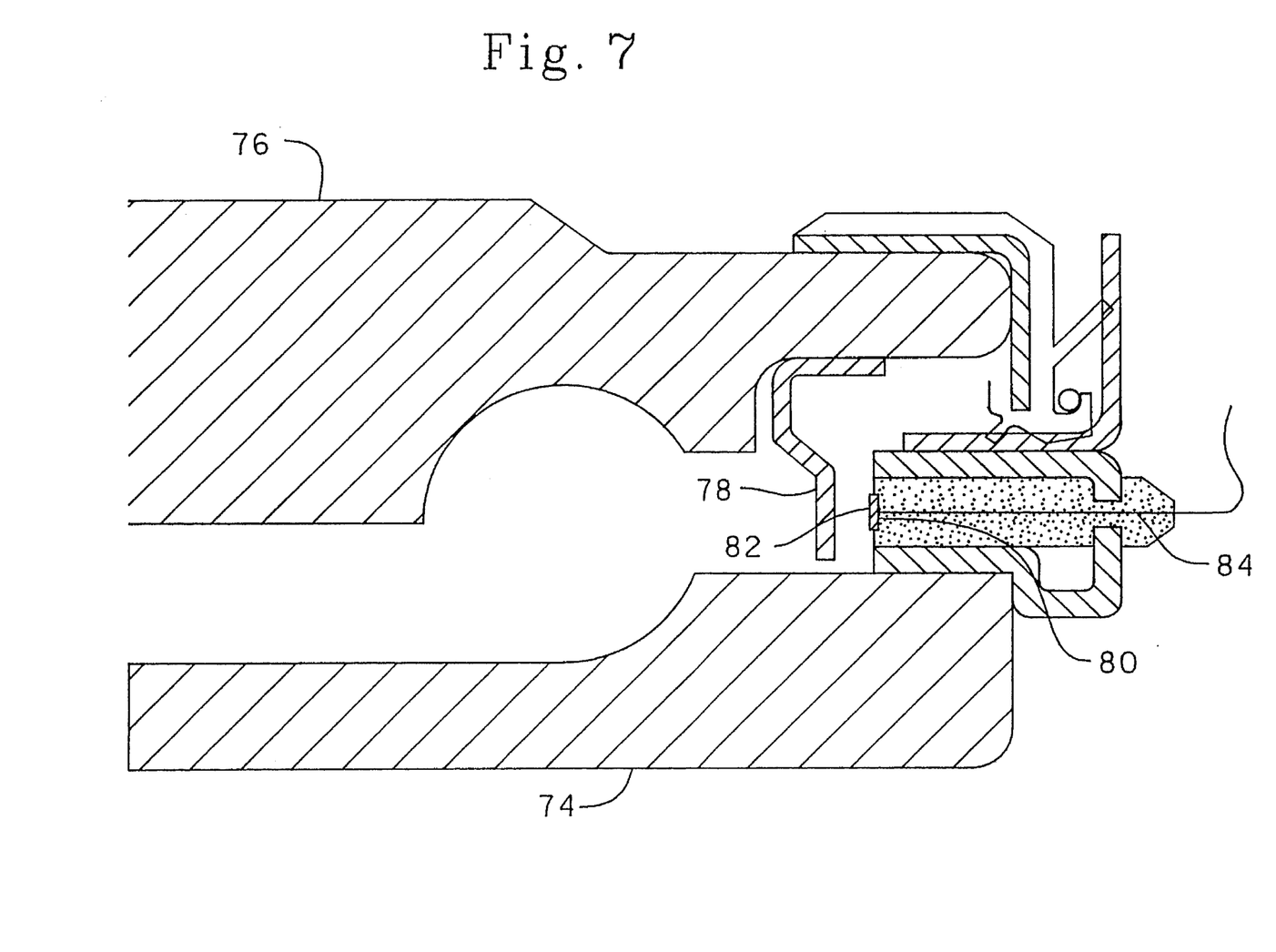
FIG. 7 is an exploded cross sectional view of an integrated fiber optic sensor and bearing assembly.

In another embodiment, an integrated fiber optic sensor and bearing assembly is provided. In the integrated fiber optic sensor and bearing assembly, a magnetic signal is produced using a stationary ring 74, a rotating ring 76, configured to rotate around the inner ring 74, and a tone ring 78 having multiple poles and being carried by the rotating ring 76. The tone ring 78 is configured to rotate with the rotating ring 76 and produce an alternating magnetic field indicative of the wheel bearing rotational speed.

A B.I.G. crystal 80 having a reflective surface 82 is positioned in the vicinity of the tone ring 78 so that the crystal domains align themselves to the magnetic field created by the tone ring 78. A fiber optic cable 84 carrying light from a light source is positioned to shine the light through the B.I.G. crystal 80 and off the reflective surface 82 as described above. Light reflected back by the reflective surface 82 is carried by the fiber optic cable 84 back to an optic receiver where it is converted to an electrical signal and passed onto a controller. The small size of the B.I.G. crystal makes possible sensor/bearing combinations that would not otherwise be available. Also, since the sensor is sensitive primarily to magnetic intensity (not direction), it can be placed at different angles relative to the tone ring 78, allowing further flexibility in the way the sensor and bearing can be combined. A back-biasing magnet can be included in the assembly for forcing the magnetic field away from zero crossings and the assembly can be completely encased and sealed for protection.

It is to be understood that the invention is not limited to the exact construction illustrated and described above, but that various changes and modifications may be made without departing from the spirit and scope of the invention as defined in the following claims.

We claim:

1. A fiber optic sensor system for detecting movement or position of a rotating wheel bearing in a bearing assembly, said system comprising:

a source of light;

a magneto-optical material for modulating said light, said magneto-optical material having discrete magnetic domains each domain having an anisotropic optical property;

means for detecting an intensity of said modulating light;

means for carrying said light between said source of light, said magneto-optical material and said means for detecting;

a multi-pole magnetic tone ring for creating a varying magnetic field in the vicinity of said magneto-optical material indicative of movement and position of said rotating wheel bearing wherein said magnetic field causes said domains to align themselves to said magnetic field thus causing the optical property of said domains to become continuous when viewed from a single direction, wherein the amount of alignment of said domains is proportional to the speed of said rotating wheel bearing and the amount of light transmitted is a function of the amount of alignment of said domains.

2. A sensor system according to claim 1, wherein said means for carrying further comprises a single fiber optic cable operably connected between said source of light, said magneto-optical material and said means for detecting for providing an optical path for carrying said light between said source of light, said magneto-optical material and said means for detecting, wherein said light is carried from said source of light to said magneto-optical material by said fiber optic cable where said light is affected by and travels through said magneto-optical material and is reflected back toward said cable by a reflective surface, said reflected light being carried to said means for detecting by said cable.

3. A sensor system according to claim 2, further comprising an optical coupler for separating light transmitted from said source of light from light reflected back to said means for detecting by said reflective surface.

4. A sensor system according to claim 2, wherein said fiber optic cable is a single-mode fiber optic cable.

5. A sensor system according to claim 2, further comprising an optical coupler operably connected to said fiber optic cable between said light source, said magneto-optical material and said means for detecting wherein light generated by said light source is carried by said fiber optic cable through said coupler to said magneto-optical material where said light is modulated according to the characteristics of said magnetic field and reflected back along said fiber to said coupler where said coupler sends part of the resulting reflected light to said means for detecting.

6. A sensor system according to claim 1, wherein said magneto-optical material is bismuth iron garnet.

7. A sensor system according to claim 1, wherein said system is completely encased and sealed for packaging in a bearing assembly.

8. A senor system according to claim 1 further comprising a rotating race, and a non-rotating race wherein said rotating race is configured to rotate around said non-rotating race with said rotating wheel bearing and said tone ring is operably connected to said rotating race, said tone ring having multiple poles and being configured to produce an alternating magnetic field indicative of said wheel bearing rotational speed and position.

9. A sensor system according to claim 1, wherein said means for detecting further converts said detected intensity of said refracted light into an electrical signal indicative of movement and position of said rotating wheel bearing.

10. A sensor system according to claim 9, further comprising an anti-lock brake controller adapted for receiving said electrical signal, determining when a wheel lock-up condition is occurring and relieving braking pressure in such conditions to maintain vehicle stability and directional control.

11. A sensor system according to claim 9, further comprising a traction control electronics package adapted for receiving said electrical signal, determining when a loss of traction occurs on a wheel and applying braking torque to said wheel causing a torque transfer to a non-skidding wheel.

12. A sensor system according to claim 1 further comprising a back-biasing magnet for forcing magnetic excitation created by said magnetic ring away from zero-crossings.

13. A sensor system according to claim 1 wherein said tone ring is zero balanced so that said alternating magnetic field has equal positive and negative peaks.

14. A sensor system according to claim 1 further comprising an antilock brake controller adapted for receiving said reflected light determining, from said light intensity, when a wheel lock-up condition is occurring and relieving braking pressure in such conditions to maintain vehicle stability and directional control.

15. A sensor system according to claim 1 further comprising a traction control electronics package adapted for receiving said reflected light, determining, from said light intensity, when a loss of traction occurs on a wheel and applying braking torque to said wheel causing a torque transfer to a non-skidding wheel.

16. An integrated fiber optic sensor bearing assembly for detecting the movement or position of a rotating wheel bearing comprising:

a stationary ring;

an rotating ring configured to rotate with said wheel bearing and around said stationary ring;

a tone ring operably connected to said rotating ring, said tone ring having multiple poles and being configured to rotate with said rotating ring producing an varying magnetic field indicative of said wheel bearing rotational speed and position;

a magneto-optical material for modulating light generated by an external source of light, said magneto-optical material having discrete magnetic domains each domain having an anisotropic optical property wherein said magnetic field causes said domains to align themselves to said magnetic field thus causing the optical property of said domains to become continuous when viewed from a single direction, wherein the frequency of alignment of said domains is proportional to the rotational speed of said wheel bearing;

a reflective surface operably connected to said magneto-optical material for reflecting said modulated light wherein the amount of light reflected is proportional to the amount of alignment of said domains;

a fiber optic cable for carrying said light between said source of light and said magneto-optic material and for carrying said reflected light to an external means for detecting light.

17. An integrated fiber optic sensor bearing assembly according to claim 16 wherein said assembly is completely encased and sealed.

18. An integrated fiber optic sensor bearing assembly according to claim 16 wherein said magneto-optic material is a bismuth iron garnet crystal.

19. An integrated fiber optic sensor bearing assembly according to claim 16 further comprising a back-biasing magnet for forcing said varying magnet field away from zero-crossings.

20. An integrated fiber optic sensor bearing assembly according to claim 16 wherein said fiber optic cable is a single-mode fiber optic cable.

21. An integrated fiber optic sensor bearing assembly according to claim 16 wherein said tone ring is zero balanced so that said varying magnetic field has equal positive and negative peaks.

* * * * *